United States Patent
Mueller et al.

(10) Patent No.: US 10,587,965 B2
(45) Date of Patent: Mar. 10, 2020

(54) ADAPTABLE HEARING DEVICE CHARGING PORT FOR A HEARING DEVICE CHARGER

(71) Applicant: Sonova AG, Staefa (CH)

(72) Inventors: Josef Mueller, Feusisberg (CH); Jonas Meyer, Staefa (CH); Bruno Gabathuler, Wald (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/257,102

(22) Filed: Jan. 25, 2019

(65) Prior Publication Data

US 2019/0239004 A1   Aug. 1, 2019

(30) Foreign Application Priority Data

Jan. 30, 2018   (EP) .................................... 18154017

(51) Int. Cl.
| | | |
|---|---|---|
| *H04R 25/00* | (2006.01) | |
| *H04R 25/02* | (2006.01) | |
| *H02J 7/00* | (2006.01) | |

(52) U.S. Cl.
CPC .......... *H04R 25/556* (2013.01); *H02J 7/0044* (2013.01); *H04R 25/02* (2013.01); *H04R 25/554* (2013.01); *H04R 2225/31* (2013.01)

(58) Field of Classification Search
CPC .. H04R 25/554; H04R 25/556; H04R 25/602; H04R 25/609; H04R 2225/31; H04R 2225/33; H02J 7/00; H02J 7/0003

USPC .................. 381/312–331; 320/110, 114, 115
See application file for complete search history.

(56) References Cited

U.S. PATENT DOCUMENTS

| | | | |
|---|---|---|---|
| 8,213,651 B2 * | 7/2012 | Schmidt | H04R 25/556 381/23.1 |
| 2008/0118093 A1 | 5/2008 | Klemenz et al. | |
| 2008/0292123 A1 * | 11/2008 | Jensen | H04R 25/00 381/322 |
| 2013/0238829 A1 * | 9/2013 | Laycock | H04R 1/1033 710/303 |

FOREIGN PATENT DOCUMENTS

DE   102015203536 A1   9/2016

OTHER PUBLICATIONS

The European Patent Office, the Extended European Search Report, dated Jun. 11, 2018, 9 pages, Munich, Germany.

* cited by examiner

*Primary Examiner* — Ahmad F. Matar
*Assistant Examiner* — Sabrina Diaz

(57) ABSTRACT

An adaptable/adjustable hearing device charging port (10) for a hearing device charger (7) that can adapt/adjust in size to accommodate and hold hearing devices (2) of different sizes and/or shapes. The adjustable hearing device charging port (10) adapts elastically so that hearing devices (2) of different sizes can be inserted into the hearing device charging port (10) and can be hold in a charging position in the hearing device charger (7), in which charging position hearing device charging contacts (6) of the hearing device (2) are electrically contacted with charger contacts (8) in the hearing device charger (7).

10 Claims, 7 Drawing Sheets

ADAPTABLE HEARING DEVICE CHARGING PORT FOR A HEARING DEVICE CHARGER

BACKGROUND

To remove the need for changing batteries in a hearing device, hearing devices are designed to be rechargeable. As such, hearing devices are often equipped with rechargeable batteries that can be recharged in a hearing device charger, while the batteries are still in the hearing device. To charge the hearing device, the hearing device is inserted into a charging port of the hearing device charger. For effective charging of the hearing device, the hearing device is held in a charging position in the hearing device charger, such that hearing device charging contacts/terminals on the hearing device contact electrically charger contacts in the hearing device charger. In essence, the charging port comprises a vault into which a hearing device can be inserted, with charging terminals disposed in the vault for contacting charging terminals on the hearing device.

By way of example, U.S. Pat. No. 8,253,377 (the '377 patent') describes a hearing aid battery charger for a hearing aid equipped with rechargeable batteries. In the '377 patent, the hearing aid is held in a charging position in the hearing aid battery charger, while a charging current is provided to the hearing aid batteries. Since hearing devices come in different shapes and sizes, the hearing device charger is manufactured with a charging dock that is shaped and sized for a particular hearing device. Normally, the hearing device is purchased with a hearing device charger, which may be configured as a box or the like to store the hearing device and/or hearing device accessories as well as to serve as a charger for the hearing device.

SUMMARY

In embodiments of the present disclosure, an adaptable hearing device charging port for a hearing device charger is provided, which is configured to adapt to receive and hold hearing devices of different sizes in a charging position in the hearing device charger. In the charging position, the adaptable hearing device charging port holds the hearing device such that electrical hearing device charging contacts on the hearing device, for recharging batteries in the hearing device, are contacted with charger contacts of the hearing device charger. In embodiments of the present disclosure, because the hearing device charging port is elastically adaptable it can adapt in shape and/or size to receive and hold hearing devices of different sizes in the hearing device charger in the charging position.

In embodiments of the present disclosure, the adaptable hearing device charging port comprises a receiving section with a receiving opening through which the hearing device is inserted into the adaptable hearing device charging port and a holder for holding the hearing device. The holder comprises an elastically adjustable holding outer-wall that defines a holding cavity into which at least a part of the hearing device can be inserted through the holder opening in the holding outer-wall. The holding outer-wall is configured to be elastically adjustable so that it can expand elastically to accommodate the part of the hearing device and elastically couples with the that part of the hearing device to hold the hearing device in the adaptable hearing device charging port.

The holding cavity and/or the holder opening of the holding outer-wall have at least one cross-sectional dimension that is smaller than at least one cross-sectional dimension of the hearing device to provide for elastic adjustment of the holding outer-wall and/or the holder opening when the hearing aid is inserted into the adaptable hearing device charging port, and for elastic coupling of the holding outer-wall with the inserted part of the hearing device. To provide for charging of hearing devices of different sizes, the holding cavity and/or the holder opening in the holding outer-wall have at least one cross-sectional dimension that is smaller than at least one cross-sectional dimension of the smallest hearing device of the hearing devices of different sizes and/or shapes. This configuration of the adaptable hearing device charging port with respect to the different hearing devices provides that the adaptable hearing device charging port will flexibly adapt to accommodate and hold each, a limited group or a type of hearing devices of different sizes and/or shapes.

In some embodiments, the receiving section may comprise a substrate/rigid material with an receiving opening through which the hearing device may be input into the holding cavity. In some embodiments, the receiving opening may be shaped so that the user can only input the hearing device in to the adaptable hearing device charging port in a limited number of orientations. The substrate/rigid material of the receiving section may be beveled, comprise a concave shape or the like to guide a hearing device to the receiving opening and into the holding cavity. In some embodiments, the holding outer-wall of the holding cavity may be coupled with the substrate/rigid material of the receiving section. In some embodiments, the at least a part of the holding outer-wall may be formed by a part of the substrate/rigid material of the receiving section. The receiving section and at least parts of the holding outer-wall can be produced for instance by injection molding.

In some embodiments, the holder opening may be smaller than the receiving opening. In some embodiments, the holder opening formed by the holding outer-wall may be misaligned or displaced with the receiving opening to provide for receiving the hearing device in the holding cavity. The difference in size, shape and/or alignment provides amongst other things that hearing devices that are larger than the holding cavity and/or the holding opening in the holding outer-wall can pass through the receiving opening and will then be hold in the charging position in the holding cavity. Additionally, the receiving opening may act as a guide to guide a hearing device to be inserted into the holding cavity, to provide for receiving the hearing device in the holding cavity. The receiving section may also guide the hearing aid into the holding cavity in a way that aligns the hearing device charging contacts with the charger contacts of the hearing device charger.

In some embodiments, the adaptable hearing device charging port is configured to be positioned fixedly or replaceably in a hearing device charger to receive and hold hearing devices of different sizes in the charging position such that hearing device charging contacts are held in electric contact with charger contacts of the hearing device charger. In some embodiments, the adaptable hearing device charging port may be configured so that it is modular in nature and can be inserted into the hearing device charger during the manufacturing process.

In some embodiments, the holding outer-wall of the holding cavity comprises an elastic material, such as: rubber; plastic/polymer materials, such as spandex, vinyl, nylon etc.; elastomers, such as synthetic rubber, nitrile rubber, silicone rubber, urethane rubbers, chloroprene rubber, ethylene vinyl acetate etc.; and/or the like.

In some embodiments, the holder of the adaptable hearing device charging port comprises two sections, a fixed section comprising a rigid material and configured to guide the hearing device to the charging position, and a movable section configured to elastically adapt to accommodate and hold the hearing device in the hearing device charging port. The fixed section may be configured to guide a hearing device inserted into the holding cavity so that the hearing device charging contacts electrically contact the charger contacts in the hearing device charger.

The moveable section may comprise an elastic material that may elastically adjust to accommodate the hearing device and to elastically hold the hearing device in the adaptable hearing device charging port. In some embodiments, the moveable section may comprise a rigid material that is elastically coupled with the fixed section. For example, an O-ring or a band of elastic material may be used to encircle and/or couple the two sections. In such embodiments, the elastic coupling provides for the elastic adjustment of the holding outer-wall of the holding cavity to accommodate the hearing device. The moveable section may be hingedly coupled, rotatably coupled, pivotably and/or the like with the fixed section to provide that the two sections can move with respect to one another so that the holding outer-wall and the holder opening formed by the two sections is adjustable/adaptable.

In some embodiments, a contact opening or slot is provided in the holding outer-wall of the holding cavity so that hearing device charging contacts can contact electrically charger contacts in the hearing device charger. The contact opening may comprise a slot that may be configured to run appurtenant to the charger contacts of the hearing device charger so that, as the hearing device is inserted into the adaptable hearing device charging port, hearing device charging contacts contact and/or slide along charger contacts in the hearing device charger through the contact opening. In some embodiments, the charger contacts of the hearing device charger may extend through the contact opening into the holding cavity. By using a contact opening that exposes a length of the charger contacts of the hearing device charger, hearing devices of different sizes and/or shapes may be received by the adaptable hearing device charging port in the charging position where the hearing device charging contacts contact at least a part of the length of the charger contacts of the charger exposed by the contact opening. In other embodiments the charger contacts may be fixed to or separated from the adaptable hearing device charging port and they may be positioned outside of the holding cavity. In the latter embodiment the hearing device charging contacts extend through the contact opening and contact the charger contacts outside of the holding cavity.

These and further objects, features and advantages of the present invention will become apparent from the following description when taken in connection with the accompanying drawings which, for purposes of illustration only, show several embodiments in accordance with the present disclosure.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
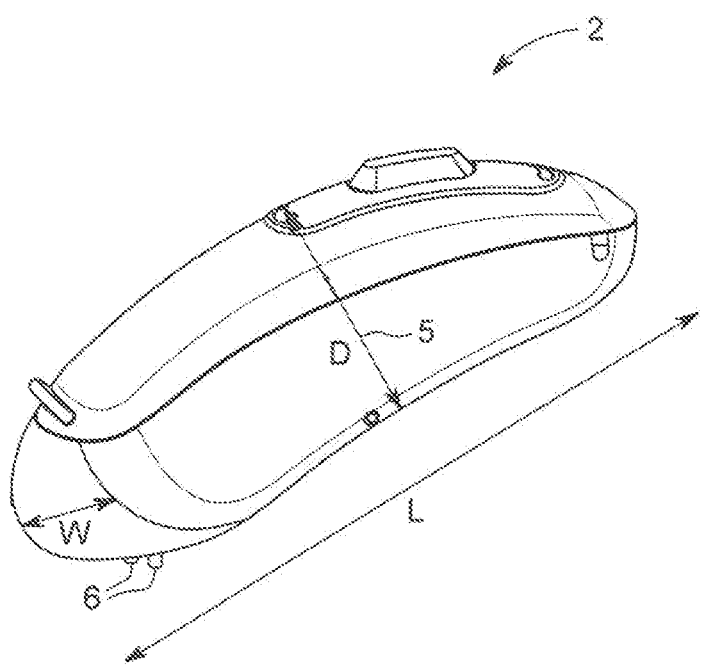
FIG. 1A depicts partially a rechargeable hearing device that may be charged in a hearing device charger using an adaptable hearing device charging port, in accordance with some embodiments of the present disclosure.

The ensuing description provides some embodiment(s) of the invention, and is not intended to limit the scope, applicability or configuration of the invention or inventions. Various changes may be made in the function and arrangement of elements without departing from the scope of the invention as set forth herein. Some embodiments maybe practiced without all the specific details. For example, circuits may be shown in block diagrams in order not to obscure the embodiments in unnecessary detail. In other instances, well-known circuits, processes, algorithms, structures and techniques may be shown without unnecessary detail in order to avoid obscuring the embodiments.

The phrases "in some embodiments" "according to some embodiments" "in the embodiments shown", "in other embodiments" generally mean the particular feature, structure, or characteristic following the phrase is included in at least one implementation of the disclosed technology, and may be included in more than one embodiments. In addition, such phrases do not necessarily refer to the same embodiments or different implementations.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well known methods, procedures, components, and systems have not been described in detail so as not to unnecessarily obscure features of the embodiments. In the following description, it should be understood that features of one embodiment may be used in combination with features from another embodiment where the features of the different embodiment are not incompatible.

Hearing devices include hearing instruments—such as behind-the-ear hearing aids, in-the-ear hearing aids in standard or custom shapes etc.—earphones, in-ear headphones, noise protection systems worn on/in the ear that include a speaker, and/or the like.

Hearing devices may be configured to be rechargeable to avoid the inefficient and problematic issue of replacing batteries. Moreover, charging systems are often designed to charge the rechargeable batteries in-situ, e.g., while installed in the hearing device. For example, the '377 patent describes systems and methods for charging a hearing aid in a charger without removing the hearing aid's rechargeable batteries.

Hearing devices, especially hearing devices equipped with rechargeable batteries, are being designed to smaller scales to make the instruments less bulky and to provide that the instruments can be comfortably and unobtrusively positioned in and/or proximal to the ear. Hearing device designs often comprise miniaturized systems that are almost invisible on the wearer. Further, hearing devices are being made of materials, such as polymers, metals and/or the like, that increase the durability and/or wear resistance of the instrument and/or make the hearing device cosmetically appealing.

Different hearing device functionalities, construction materials, cosmetic designs and/or the like provide that hearing devices come in many different shapes and sizes.

Figure 1B:
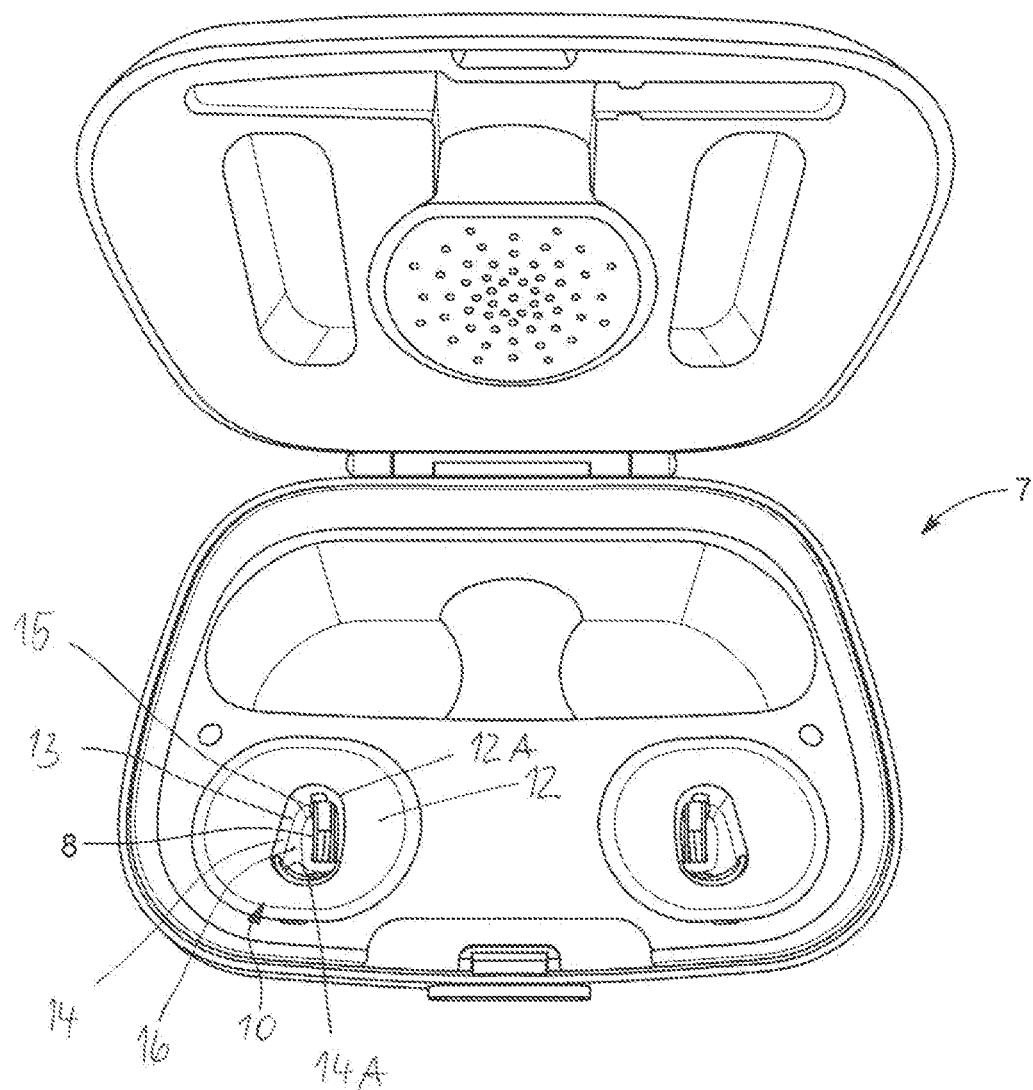
FIG. 1B illustrates a hearing device charger for charging of rechargeable hearing devices that may be used with an adaptable hearing device charging port, in accordance with some embodiments of the present disclosure, to charge hearing devices of different shapes and/or sizes.

FIG. 1A depicts a rechargeable hearing device 2 that may be charged in a hearing device charger 7 shown in FIG. 1B and comprising an adaptable hearing device charging port 10, in accordance with some embodiments of the present disclosure. The shown hearing device 2 is a behind-the-ear hearing aid of which for the sake of simplicity some parts, like the ear piece, are not shown or not shown completely. The illustrated hearing device 2 is only an example of a hearing device to describe certain dimensions and could be replaced by another type of hearing devices without limiting the scope of the present disclosure.

The hearing device 2 may comprise a length L that is the largest dimension of the hearing device 2. The length L is generally the longest dimension as the hearing device 2 may be designed to fit comfortably behind a user's ear. The hearing device 2 comprises a width W and a depth D. The hearing device 2 may be designed with a curved geometry to provide for comfort and for holding the hearing device 2 behind the user's ear. The width W and the depth D provide a cross-section W×D of the hearing device 2. Where the hearing device 2 has a curved/graduated design the cross-section will vary along the length L of the hearing device 2.

In general, hearing devices are shaped to be securely and comfortably worn by a user with a longer length dimension to fit all of the required components within the hearing device. The hearing device 2 may be designed with flat sides to provide that the user can easily wear and handle the hearing device 2, including inserting the hearing device 2 into the hearing device charger 7. The hearing device 2 includes electrical hearing device charging contacts 6 that are configured to contact charger contacts 8 in the hearing device charger 7 as shown in FIG. 1B. The hearing device charging contacts 6 are disposed at an end of the hearing device 2 such that in a charging position the electrical hearing device charging contacts 6 contact charger contacts 8 in the hearing device charger 7. The electrical hearing device charging contacts 6 provide for electrical communication with rechargeable batteries (not shown) in the hearing device 2.

FIG. 1B illustrates a hearing device charger 7 that comprises an adaptable hearing device charging port 10, in accordance with embodiments of the present disclosure, to charge rechargeable hearing devices of different sizes and/or shapes, such as the hearing device 2 of FIG. 1A.

The hearing device charging port 10 includes a contact opening 15 configured to provide access to charger contacts 8 for charging the hearing device 2 when the hearing device 2 is inserted into the hearing device charging port 10 in the charging position. In this embodiment of the hearing device charging port 10, the charger contacts 8 are angled diagonally at the bottom of hearing device charging port 10 and partially extend into the hearing device charging port 10 to provide that the electrical hearing device charging contacts 6 on the hearing device 2 "slide" along and into contact with the charger contacts 8 when the hearing device 2 is inserted into the hearing device charging port 10.

The adaptable hearing device charging port 10 is configured so that the hearing device 2 can be inserted lengthways into the hearing device charging port 10. This configuration is to provide for ease of use for a hearing device user when inserting the hearing device 2 and to provide that the hearing device 2 is stably hold in the hearing device charging port 10. Because of the difference in shapes and/or sizes, the hearing device charging port 10 is designed to be adaptable with dimensions to receive and charge hearing devices of different shapes and/or sizes. This means that not different hearing device charging ports 10 must be manufactured for different hearing device designs and thus the cost of manufacture can be decreased. In other words, it allows interoperability of the hearing device charger 7 with different hearing devices.

Figure 2A:
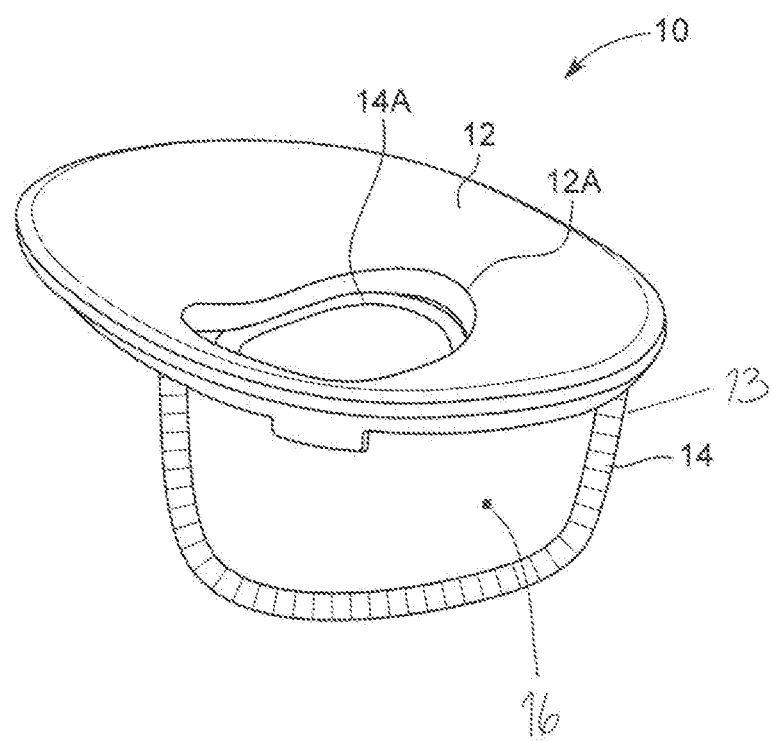
FIG. 2A illustrates an adaptable hearing device charging port for use in a hearing device charger that is configured to adjust in shape and/or size to provide for charging of hearing devices of different sizes, in accordance with some embodiments of the present disclosure.

FIG. 2A illustrates the adaptable hearing device charging port 10 for use in a hearing device charger 7 configured to adjustable to hearing devices of different sizes and/or shapes, in accordance with some embodiments of the present disclosure.

As illustrated in FIG. 2A, the adaptable hearing device charging port 10 comprises a receiving section 12 and a holder 13 which has a holding cavity 16 formed by a holding outer-wall 14. The receiving section 12 comprises an receiving opening 12A through which the rechargeable hearing device 2 can be inserted into the holding cavity 16. In embodiments of the present disclosure, the holding outer-wall 14 is configured to be elastically adjustable so that it can elastically adjust in shape and/or size to accommodate rechargeable hearing devices of different sizes and/or shapes. The holding outer-wall 14 forms a holder opening 14A through which at least a part of the hearing device 2 can be inserted into the holding cavity 16. Since the holding outer-wall 14 is elastically adjustable also the holder opening 14A can adjust in shape and/or size to receive the hearing device 2. In some embodiments, the holder opening 14A is configured to provide a smaller or/and displaced opening than that of the receiving opening 12A. In some embodiments the holder 13 can be replaceably fixed to the receiving section 12. The adaptable hearing device charging port 10 as such might be replaceably fixed in or to the hearing device charger 7. Alternatively, the adaptable hearing device charging port 10 could also be formed integrally with the hearing device charger 7.

Figure 2B:
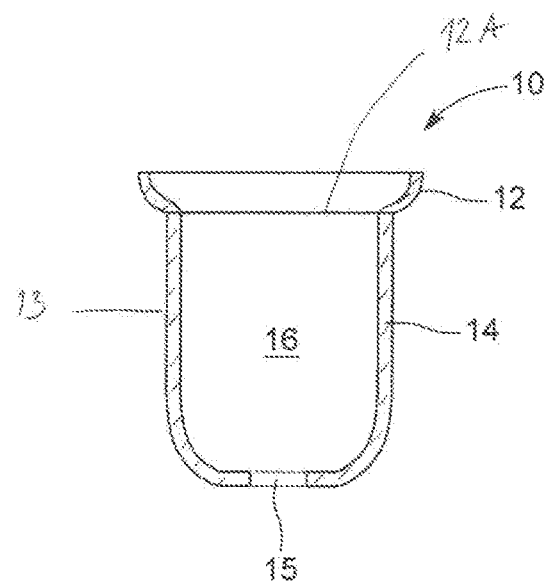
FIG. 2B illustrates a cross-sectional view of the adaptable hearing device charging port illustrated in FIG. 2A, in accordance with some embodiments of the present disclosure.

FIG. 2B illustrates a cross-sectional view of the adaptable hearing device charging port 10 illustrated in FIG. 2A. In this embodiment the receiving section 12 of the adaptable hearing device charging port 10 comprises a rigid material and defines the receiving opening 12A into which a hearing device 2 can be introduced into the holding cavity 16.

In this embodiments the holding cavity 16 is defined by an elastically adjustable holding outer-wall 14, that is configured to elastically adjust to accommodate the (not shown) hearing device 2 inserted into the holding cavity 16 and thereby elastically couples with the hearing device 2 and holding it by friction fit in the charging position. The elastic properties of the holding outer-wall 14 can be provided by using at least partially elastic materials. Elastic materials are materials that deform in shape and size when a force is applied, and then return to their original shape size when the force is removed. Merely by way of example, elastic materials may comprise: plastic/polymer materials, such as spandex, vinyl, nylon etc.; elastomers, such as natural or synthetic rubber, nitrile rubber, silicone rubber, urethane rubbers, chloroprene rubber, ethylene vinyl acetate etc. and/or the like. It would also be possible that the holding outer-wall 14 comprises a textile consisting of a network of fibers and forms in this way at least partially a sock-like structure.

Figure 2C:
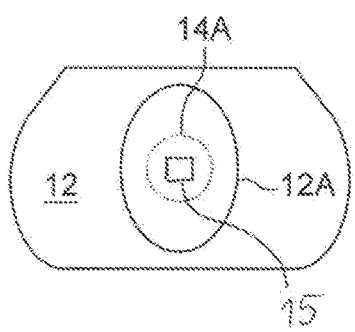
FIG. 2C illustrates a top-view of an adaptable hearing device charging port having an elastic holding outer-wall in accordance with some embodiments of the present disclosure.

Such an embodiment comprising an elastically adjustable holding outer-wall 14 is also shown in FIG. 2C. The holding outer-wall 14 forms the holder opening 14A configured to provide for insertion of the hearing device 2 into the holding cavity 16, which holder opening 14A, since it is formed by the elastically adjustable holding outer-wall 14, can elastically adjust to the size and/or shape of the hearing device 2. In the shown empty state in which no hearing device 2 is inserted in the adaptable hearing device charging port 10 the holder opening 14A is smaller than the receiver opening 12A.

The contact opening 15 is provided in the elastically adjustable holding outer-wall 14 and configured so that when the hearing device 2 is inserted into the charging position in the holding cavity 16, hearing device charging contacts 6 on the hearing device 2 are contacted with the charger contacts 8 (not shown) in the hearing device charger 7.

The embodiment illustrated in a top-view of the receiving section 12 in FIG. 2C shows the receiving opening 12A, the elastically adjustable holding outer-wall 14 forming the holder opening 14A and the contact opening 15. Also here the receiving opening 12A and the holder opening 14A are configured to provide for insertion of the hearing device 2 into the adaptable hearing device charging port 10 in a lengthwise manner. The holder opening 14A is able to elastically expand to accommodating a cross-section of the length of the not shown hearing device 2.

In this embodiments, the holder opening 14A is smaller than the receiving opening 12A in an empty state in which the hearing device 2 is not inserted in the adaptable hearing device charging port 10 and thus not in the charging position. The elastic configuration of the holder opening 14A provides that a hearing device 2 with cross-sectional dimensions that are less than the receiving opening 12A in the empty state can be input and safely hold in the charging position in the adaptable hearing device charging port 10. Because the holder opening 14A is formed by the elastically adjustable holding outer-wall 14, upon insertion of the hearing device 2 the holder opening 14A can elastically widen and adapt to receive hearing devices having one or more cross-sectional dimensions W, D that are greater than the dimensions of the holder opening 14A in the empty state.

In embodiments of the present disclosure in that empty state, the holder opening 14A and/or the holding cavity 16 are sized to provide that a cross-sectional size of the holder opening 14A and/or the holding cavity 16 is smaller or equal than the largest of the cross-sectional dimensions W, D of the hearing device 2 to provide that the holder opening 14A and/or the holding cavity 16 has to elastically adjust to accommodate the hearing device 2. To accommodate hearing devices of different sizes, in embodiments of the present disclosure, the holder opening 14A and/or the holding cavity 16 are configured to have a cross-section that is smaller or equal than the largest of the cross-sectional dimensions W, D of the smallest of the different hearing devices; in this way, the holder opening 14A and/or the holding cavity 16 must elastically adjust in shape and/or size to accommodate each of hearing devices of different sizes.

In some embodiments, the receiving opening 12A serves as a guide receptacle to guide the hearing device 2 through the holder opening 14A into a charging position in the holding cavity 16. In order to further support the insertion process and to make sure that in the charging position the hearing device charging contacts 6 contact electrically the charger contacts 8 and stay in electric contact during the charging process the hearing device 2 may comprise a not shown magnet or magnetizable component which is attracted by magnetic force from a corresponding charging port magnet or magnetizable charging port component in the hearing device charger 7 so that the hearing device 2 will be attracted to more easily and precisely travel to its intended charging position. The receiving section 12 may be beveled and/or have a concave design and/or have smooth surface to guide the input of the hearing device 2 into the adaptable hearing device charging port 10.

The receiving opening 12A may have be shaped to provide that the hearing device 2 can only be inserted into the adaptable hearing device charging port 10 in a limited number of alignments. In some embodiments, the input opening 12A may be shaped to provide that the hearing device can only be input into the adaptable hearing device charging port 10 in one or two different alignments. In such embodiments, the holding cavity opening 14A may be aligned with the receiving opening 12A to provide that a dimension of a cross-section of the receiving opening 12A and/or the holding cavity 16 is less or equal than a dimension W, D of the corresponding cross-section of the hearing device 2 when the hearing device 2 is inserted through the receiving opening 12A in one of the limited number of alignments.

Figure 2D:
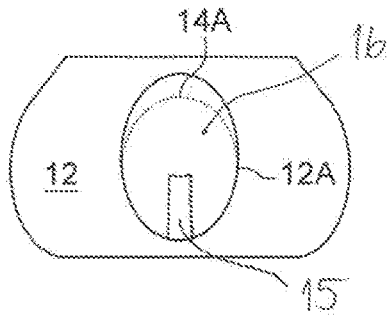
FIG. 2D illustrates a top-view of another embodiment of the adaptable hearing device charging port in accordance with some embodiments of the present disclosure in which a holder opening and a receiving opening are at least partially displaced or misaligned.

FIG. 2D illustrates a top-view of the receiving section 12 and the holder opening 14A, in accordance with some embodiments of the present disclosure.

In the embodiment in FIG. 2D, the receiving section 12 comprises an receiving opening 12A configured to receive a hearing device 2 that is input into the adaptable hearing device charging port 10. The holder opening 14A is formed by the holding outer-wall 14 providing for the hearing device 2 to be input into the holding cavity 16. The receiving opening 12A and the holder opening 14A are configured to provide for insertion of the not shown hearing device 2 into the adaptable hearing device charging port 10 in a lengthwise manner, such that the receiving opening 12A and the holder opening 14A are shaped with respect to accommodating a cross-section of the hearing device 2. In this embodiments, at least a part of the holder opening 14A and the receiving opening 12A are partially misaligned or displaced to provide that the at least partially elastically adjustable holding outer-wall 14 is adjusted by sliding, moving or expanding back when the not shown hearing device 2 is input though the receiving opening 12A.

Figure 3A:
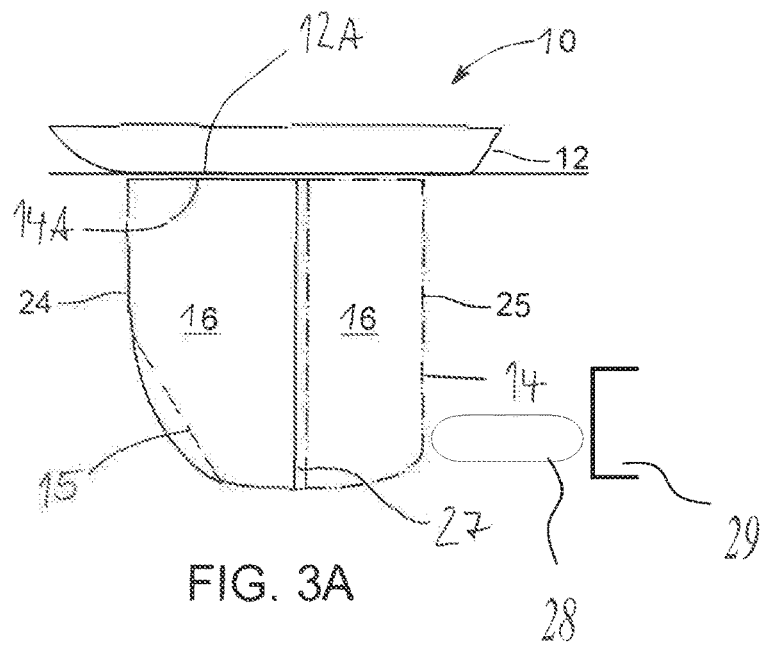
FIG. 3A illustrates an adaptable hearing device charging port for a hearing device charger, in accordance with some embodiments of the present disclosure in which a holder comprises a fixed section and a movable section connected by an elastic coupling.

FIG. 3A illustrates another embodiment of an adaptable hearing device charging port 10 for a hearing device charger 7. In this embodiment the adaptable hearing device charging port 10 comprises a holding outer-wall 14 which comprises three sections: a fixed section 24 which is fixed at the receiving section 12, an moveable section 25 and an elastic section 27 connecting the fixed section 24 and the moveable section 25. The elastic coupling provides that the moveable section 25 can move elastically relative to the fixed section 24 to provide that the holding cavity 16 and/or the holder opening 14A can elastically adapt to accommodate and hold the hearing device 2 when inserted into the adaptable hearing device charging port 10. In other words, upon inserting the not shown hearing device 2 the moveable section 25 slides back due to the elastic properties of the elastic section 27. In this embodiments, the receiving section 12 and the fixed section 24 may be formed as one integral structure. The fixed section 24 together with the elastic section 27 and the moveable section 25 define the holding outer-wall 14 forming the holding cavity 16.

The fixed section 24 preferably comprises a rigid material that is shaped to easily guide a hearing device inserted into the adaptable hearing device charging port 10 to a charging position. In some embodiments, the elastic section 27 and/or the moveable section 25 may comprises an elastic material. In some embodiments, both the moveable section 25 and the elastic section 27 may be formed as one integral part comprising an elastic material.

FIG. 3A also illustrates a spring element 28 and an interior wall element 29. The spring element 28 is optional. The spring element 28 can be a spring (e.g., coil spring, conical spring) or another element with elastic properties (e.g., a curved element with a bendable portion). The spring element 28 is configured to enable the moveable section 25 to move when a hearing device is placed in the charging port 10 such that the volume of the charging port can expand. The spring element 28 can have a spring constant designed according to Hooke's law and according to the size (e.g., volume) of hearing device devices. When no hearing device is placed inside the charging port 10, the spring element 28 can return the moveable section 25 to a first position (e.g., an upright position without a hearing device inside the charging port). In some embodiments, the spring element 28 can be fixed or anchored to the interior wall element 29 to enable the spring element 29 to provide elastic resistance against a moving moveable element 25. Although the interior wall element 29 is shown schematically as a wall of the charging port 10, it can also be a protruding element (e.g., bump) configured to extend from the interior wall of the charging port to the spring element 29. The spring element 28 can vary in size and location such that the spring element 28 enables the moveable section 25 to move between a first position and second position, where the first position relates to no hearing device in the charging port 10 and the second position relates to a hearing device in the charging port 10. The spring element 28 can also be designed to slowly move (e.g., to avoid a "snap" or quick movement the moveable section 25) by adjusting a spring constant based on properties of the spring element 28. More generally, the spring element 28 and the interior wall element 29 enable the moveable section 25 to move and/or the charging port volume to change (e.g., expand) based on a hearing device being place in or removed from the charging port, and the spring element 28 enable the holder 13 to change in volume.

Figure 3B:
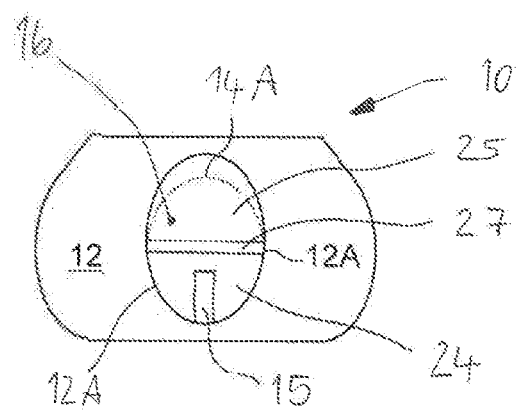
FIG. 3B illustrates a top view of the adaptable hearing device charging port illustrated in FIG. 3A, in accordance with some embodiments of the present disclosure.

FIG. 3B illustrates a top view of the embodiment shown in FIG. 3A. In this view the receiving section 12 of the adaptable hearing device charging port 10 includes the receiving opening 12A into which the hearing device 2 can be inserted into the adaptable hearing device charging port 20. As noted above, the fixed section 24, the elastic section 27 and the moveable section 25 form the holding cavity 16 and this cavity is positioned beneath the receiving opening 12A, such that at least a portion of the hearing device 2 can be inserted into the cavity through the holder opening 14A. As shown in FIG. 3B in the empty state the holder opening 14A is smaller than the receiving opening 12A. Upon insertion of the hearing device 2 the holder opening 14A will enlarge and adapt to the outer dimensions of the hearing device part which is introduced in the holding cavity 16.

Figure 3C:
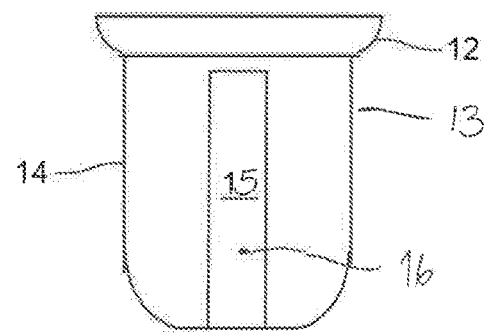
FIG. 3C illustrates a side view of the embodiment shown FIGS. 3A and 3B, in accordance with some embodiments of the present disclosure.

FIG. 3C illustrates a side view of the adaptable hearing device charging port 10 as shown in FIGS. 3A and 3B with the contact opening 15 through which the not shown charger contacts 8 can extend into the holding cavity 16 so that in the charging position they are in electric contact with the hearing device charging contacts 6. As described with respect to FIG. 2B, the charger contacts 8 may be alternatively disposed at or in the bottom of the holding cavity 16 and may extend from there into the holding cavity 16.

Upon insertion of the hearing device 2 the hearing device charging contacts 6 can slide into contact with the charger contacts 8 so that a rechargeable battery of the hearing device 2 can be charged in the charging position. Due to the adjustable holding outer-wall 14 the hearing device 2 is pushed, accommodated and/or held in this charging position. Beside the mentioned friction fit and the magnetic force also an alternative snap-fit connection may be provided to secure the hearing device 2 in the charging position in the adaptable hearing device charging port 10 and thus in the hearing device charger 7. It is also possible that the hearing device 2 is secured in the charging position by means of a lid of the hearing device charger 7 as shown in FIG. 1B which can be closed for this purpose.

Figure 4A:
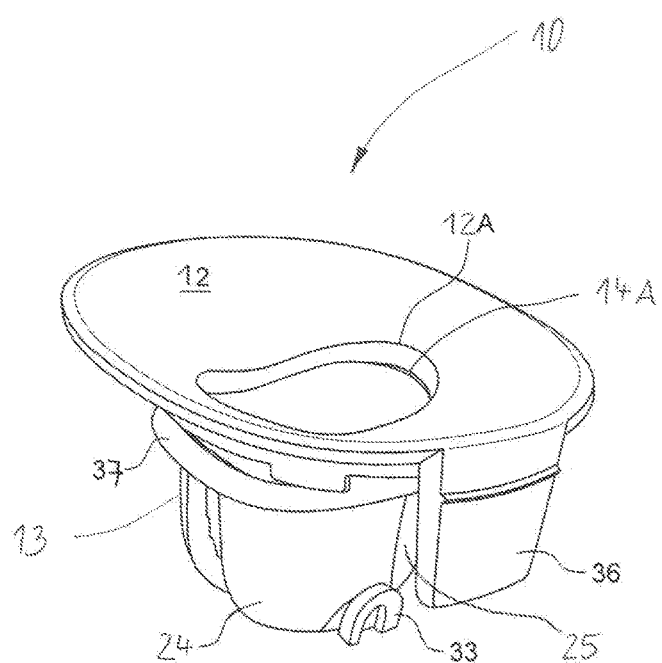
FIG. 4A illustrates a side view of an adaptable hearing device charging port for receiving hearing devices of different sizes and/or shapes, in accordance with some embodiments of the present disclosure.

FIG. 4A illustrates another embodiment of the adaptable hearing device charging port 10 for receiving hearing devices of different sizes and/or shapes, in accordance with some embodiments of the present disclosure. In this embodiment the holder 13 also comprises the fixed section 24 and the moveable section 25, both sections comprising a substantially rigid material. The moveable section 25 is pivotably connected to the fixed section 24 by means of a hinge 33.

This embodiment comprises wing-like fixations means 36 to hold the adaptable hearing device charging port 10 in the hearing device charger 7, for instance by way of a snap-fit connection, gluing etc.

Figure 4B:
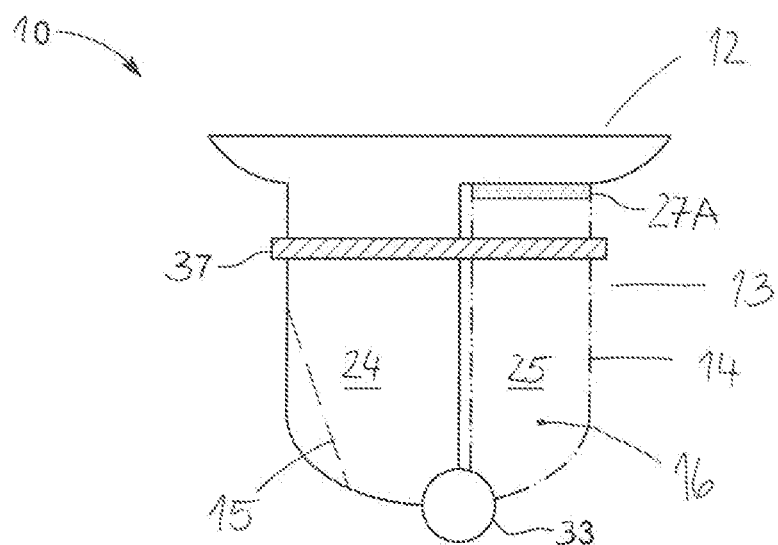
FIG. 4B illustrates a cross-sectional view of the adaptable hearing device charging port for receiving hearing devices of different sizes as depicted in FIG. 4A.

As shown in FIG. 4B and in contrast to the embodiment shown in FIG. 3A the elastic section 27A can be formed between the moveable section 25 and the receiving section 12 so as to elastically close a gap between the moveable section 25 and the receiving section 12 and/or to elastically limit an outward deflection of the moveable section 25 during insertion and accommodation of the hearing device 2. Also in this embodiment the fixed section 24, the moveable section 25 and the elastic section 27A are elements of the holding outer-wall 14 which forms the holding cavity 16 into which the hearing device 2 is at least partially inserted in the charging position.

The moveable section 25 is hingedly/pivotably coupled with the fixed section 24 by the hinge 33 which may comprise an axle, a bearing and/or the like to provide an elastic adaptation of the holding outer-wall 14 to the size and shape of hearing devices 2 to be inserted in the holding cavity 16.

In further embodiments of the present disclosure, the moveable section 25 be coupled elastically to the fixed section 24 by an elastic coupling 37, for instance in form of an O-ring which can clasp circumferentially the fixed section 24 and the moveable section 25, or by elastic bands fixed at both sections 24, 25. Such an elastic coupling 37 can be provided additionally to the elastic section 27A as shown in FIG. 4B or could replace the elastic section 27A. In both ways, the elastic section 27A allows for an elastically controlled movement of the moveable section 25 relative to the fixed section 24 in order to provide that the holding cavity 16 can adjust elastically to accommodate the hearing device 2 during insertion and hold the hearing device 2 in the charging position. In other words, during insertion of the hearing device 2 the hearing device 2 applies through the sliding insertion movement along the fixed section 24 and the moveable section 25 a force on the elastic coupling 37 and/or the elastic section 27A causing the moveable section 25 to move/pivot outwardly with respect to the fixed section 24 and thus expandably adjusts the size and/or shape of the holding cavity 16 to accommodate the hearing device 2.

The elastic coupling 37 comprises an elastic material and is configured to elastically resist the movement of the moveable section 25 section with respect to the fixed section 24, for instance by circumferentially surround or encircle the fixed section 24 and the moveable section 26 partially or completely, so as to flexibly connect the adjoining sections 24 and 25.

Figure 4C:
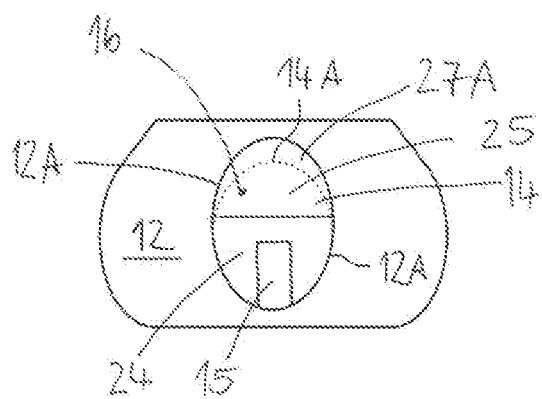
FIG. 4C illustrates a top view of the adaptable hearing device charging port shown in FIGS. 4A and 4B.

FIG. 4C illustrates a top view of the adaptable hearing device charging port 10 shown in FIG. 4B, in accordance with some embodiments of the present disclosure.

This embodiment also comprises the receiving section 12 for receiving the hearing device 2 (not shown) in the adaptable hearing device charging port 10. The receiving section 12 comprises a receiving opening 12A. The receiving opening 12A provides access into the holding cavity 16 formed by the fixed section 24 and the moveable section 25. As described above in such a configuration, when the hearing device 2 is inserted into the receiving opening 12A, a force is applied against the moveable section 25 causing the moveable section 25 to pivot outwardly with respect to the fixed section 24. This pivoting motion of the moveable section 25 expands the shape/size of the holding cavity 16 to accommodate the hearing device 2 (not shown). The pivotal motion is resisted by the elastic coupling 37 and/or the elastic section 27A, such that, when the hearing device 2 is inserted into the holding cavity 16, the elastic coupling 37 and/or the elastic section 27A, via the moveable section 25, hold/s the hearing device 2 in the charging position in the holding cavity 16.

While the principles of the disclosure have been described above in connection with specific apparatuses and methods, it is to be clearly understood that this description is made only by way of example and not as limitation on the scope of the invention.

The invention claimed is:

1. An adaptable hearing device charging port for a hearing device charger, comprising:
   a receiving section including a receiving opening configured for receiving at least a part of a hearing device; and
   a holder coupled with the receiving section and comprising a holding outer-wall defining a holding cavity configured to accommodate the at least part of the hearing device, and a holder opening in the holding outer-wall configured to receive the at least part of the hearing device through the receiving opening into the holding cavity,
   wherein the holding outer-wall is elastically adaptable to adapt in size to hold hearing devices of different sizes and/or shapes in the holding cavity in a charging position,
   wherein the holder opening is smaller or equal in size to a largest cross-sectional dimension of the hearing device,
   wherein the holding outer-wall comprises two sections: a fixed section comprising a rigid material and configured to guide the hearing device, and a moveable section comprising a rigid material elastically coupled with the fixed section by an elastic coupling to provide an elastic adjustment of the moveable section relative to the fixed section for accommodating and holding the part of the hearing device in the holding cavity in the charging position,
   wherein the elastic coupling comprises a band, an O-ring of elastic material encircling at least partially the fixed section and the moveable section, or a spring, and
   wherein the moveable section is coupled with the fixed section.

2. The adaptable hearing device charging port of claim 1, wherein the hearing device charger comprises charger contacts and the adaptable hearing device charging port is configured to provide that hearing device charging contacts on the hearing device contact the charger contacts when the hearing device is held in the charging position in the adaptable hearing device charging port.

3. The adaptable hearing device charging port of claim 2, wherein the receiving section of the adaptable hearing device charging port is beveled in shape and configured to guide the hearing device into the holding cavity.

4. The adaptable hearing device charging port of claim 1, wherein the holder opening is smaller than and/or misaligned with the receiving opening.

5. The adaptable hearing device charging port of claim 1, wherein the holding outer-wall comprises an elastic material.

6. The adaptable hearing device charging port of claim 1, wherein the holding outer-wall comprises two sections: a fixed section comprising a rigid material and configured to guide the hearing device to the charging position, and a moveable section configured to elastically adapt to accommodate and hold the hearing device in the hearing device charging port.

7. The adaptable hearing device charging port of claim 6, wherein the moveable section and/or an additional elastic section connected to the movable section comprises an elastic material.

8. The adaptable hearing device charging port of claim 2, wherein the holding outer-wall comprises a contact opening configured to provide that the hearing device charging contacts on the hearing device contact electrically the charger contacts extending through the contact opening into the holding cavity when the hearing device is in the charging position in the adaptable hearing device charging port.

9. A method for positioning hearing devices of different sizes and/or shapes in a hearing device charger, comprising:
providing an adaptable hearing device charging port comprising a holder comprising a holding outer-wall defining a holding cavity and a holder opening providing access through the holding outer-wall to the holding cavity, wherein the holding outer-wall is configured to be adaptable to accommodate and hold one of hearing devices of different sizes and/or shapes in the holding cavity and wherein the holder opening is smaller than the largest of the cross sectional dimensions (W, D) of the one of the hearing devices of different sizes and/or shapes;
receiving at least a part of the one of the hearing devices of different sizes and/or shapes into the holding cavity;
elastically adapting the size of the holding cavity to a size of the one of the hearing devices of different sizes;
guiding the one of the hearing devices of different sizes and/or shapes to a charging position in the hearing device charger; and
elastically coupling the holding outer-wall with the one of the hearing devices of different sizes and/or shapes to hold the one of the hearing devices of different sizes in the charging position,
wherein the holding outer-wall comprises two at least partially rigid sections: a fixed section and a moveable section, wherein and the fixed section is coupled to the moveable section such that the two at least partially rigid sections can rotate with respect to one another, and
wherein the fixed section is elastically coupled with the moveable section by means of an elastic coupling.

10. The method of claim 9, wherein the holder outer-wall comprises an elastic material.

* * * * *